United States Patent [19]
Itkowsky et al.

[11] Patent Number: 5,875,309
[45] Date of Patent: Feb. 23, 1999

[54] ARBITRATION SYSTEM USING LINKED TABLE

[75] Inventors: Frank A. Itkowsky, Leominster; Cary B. Robins, Newton; John Ziegler, North Grafton; Shirish B. Dandekar, Southborough, all of Mass.

[73] Assignee: 3Com Corporation, Santa Clara, Calif.

[21] Appl. No.: 843,957

[22] Filed: Apr. 18, 1997

[51] Int. Cl.[6] .......................... G06F 13/36; G06F 13/362
[52] U.S. Cl. ............................. 395/293; 370/447
[58] Field of Search ..................................... 395/293, 303, 395/728, 292, 296, 860; 370/462, 447

[56] References Cited

U.S. PATENT DOCUMENTS

| | | | |
|---|---|---|---|
| 4,803,681 | 2/1989 | Takahashi | 370/447 |
| 5,481,680 | 1/1996 | Larson et al. | 395/292 |
| 5,485,586 | 1/1996 | Brash et al. | 395/292 |
| 5,564,025 | 10/1996 | De Freese et al. | 395/290 |
| 5,708,783 | 1/1998 | Yazdy | 395/293 |

*Primary Examiner*—Gopal C. Ray
*Attorney, Agent, or Firm*—McGlew and Tuttle

[57] ABSTRACT

A computer network system containing a concentrator with a backplane that has a plurality of lines. The backplane contains data lines and control lines for managing and organizing the transfer of data between modules in the concentrator. The system contains an intelligent bus arbiter system that allow the selection of transmitting modules to occur at the same time as actual data transfer is going on between other modules. The bus arbitration system is provided for determining a sequence of bus access. A memory is provided for building a table comprising entries. Each of the entries represents a module slot identification number. Each entry also has an entry link portion which links a given entry to another entry. The system also includes arbiter logic cycling through or sequencing through and reading the table from one entry to another entry based on the entry link portion. The arbiter logic forms an output of a current slot identification number, corresponding to the module which is to have access to the bus. With this system, the number of entries having a particular module slot identification number relative to the total number of entries in the table determines a proportion of access to the bus of the module having the particular module slot identification number thereby allowing updating to the table to change access to the bus more readily.

18 Claims, 18 Drawing Sheets

Figure 6a

| address (hex) | slot number | link (next address) |
|---|---|---|
| 0 | 1 | 1 |
| 1 | 2 | 2 |
| 2 | 11 | 3 |
| 3 | 1 | 4 |
| 4 | 2 | 5 |
| 5 | 12 | 6 |
| 6 | 1 | 7 |
| 7 | 2 | 8 |
| 8 | 13 | 0 |

Figure 6b

| address (hex) | slot number | link (next address) |
|---|---|---|
| 0 | 1 | 1 |
| 1 | 2 | 2 |
| 2 | 11 | 3 |
| 3 | 1 | 4 |
| 4 | 2 | 5 |
| 5 | 12 | 6 |
| 6 | 1 | 7 |
| 7 | 2 | 8 |
| 8 | 13 | 9 |
| 9 | 1 | A |
| A | 2 | 0 |

Figure 6c

| address (hex) | slot number | link (next address) |
|---|---|---|
| 0 | 1 | 1 |
| 1 | 2 | 2 |
| 2 | 11 | 6 |
| 3 | 1 | 4 |
| 4 | 2 | 5 |
| 5 | 12 | 6 |
| 6 | 1 | 7 |
| 7 | 2 | 8 |
| 8 | 13 | 9 |
| 9 | 1 | A |
| A | 2 | 0 |

Arbiter Software Data Structures
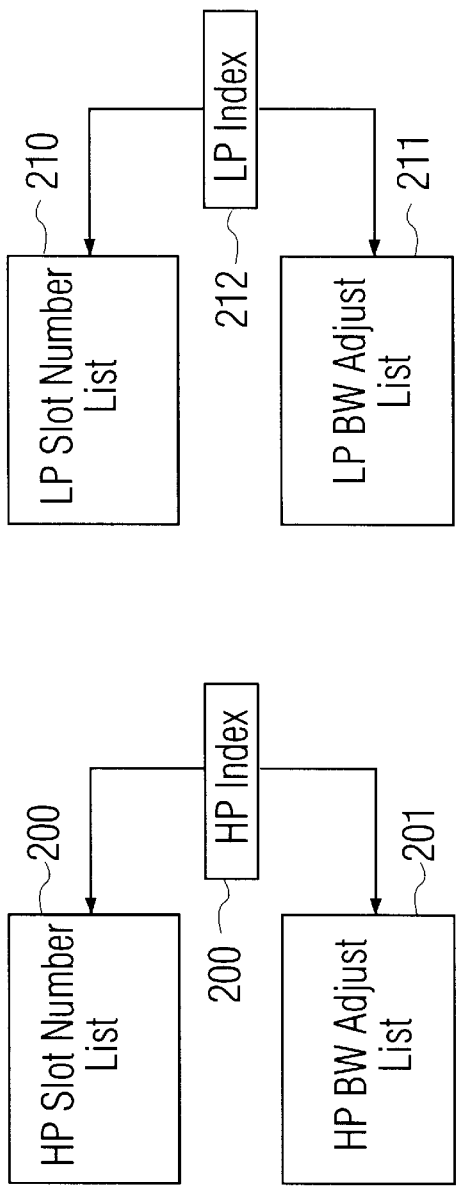
Figure 8a
Figure 8b
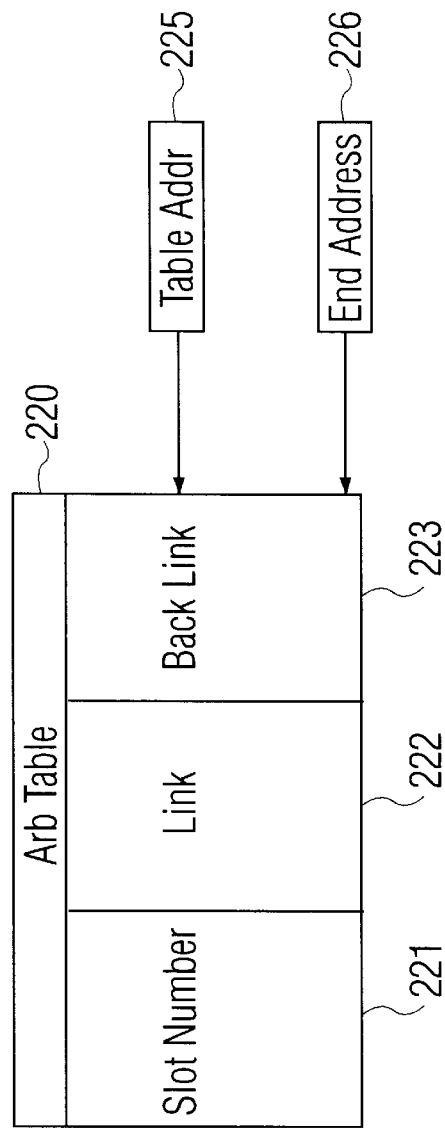
Figure 8c

ARBITRATION SYSTEM USING LINKED TABLE

FIELD OF THE INVENTION

The invention relates generally to a backplane bus access arbitration system and its application thereof, and more specifically to a system for distributing access to a high speed bus between various modules or ports including allowing some modules to have greater access than others.

BACKGROUND OF THE INVENTION

Computer networks are presently carrying larger and larger volume of information. Both documents and control signals are being sent from one computer to another through computer networks. The control signals are becoming lengthier as one computer tries to control more and more functions of another computer, and documents sent between computers are becoming lengthier. Also the increasing number of people desiring a connection to the network increases the volume handled by the network. Delays in receiving documents and in controlling of the computers increases as the size of the documents, the complexity of the control signals and the number of users on the network increases. Therefore it is very desirable to move data from one network user to another as fast as possible.

One approach to increasing data transfer is to increase the frequency of the network. The length of each bit is therefore decreased and more bits can be transferred in a given time period. However as the frequency increases, components must become more accurate and electrical signals start to behave as electromagnetic waves. These limitations form an upper limit, above which increases in the frequency become uneconomical.

Specifically in LAN applications, there are two well established access methods: Carrier Sense, Multiple Access with Collision Detection (CSMA/CD—ISO/ANSI/IEEE 802.3) and Token (Passing) Ring (802.5 Token Ring). Token Ring further includes a physical ring and physical bus manifestation. These access methods are used with multiple data rates and data formats, generating numerous protocols; in addition, there are other protocols which combine elements of both CSMA/CD and Token Passing, as well as protocols which use only some elements of the access methods (e.g. Carrier Sense, Multiple Access without Collision Detection).

Network concentrators have now been provided with a high speed bus, where all the management and control functions occur in parallel with the actual data packet transfer, and thus incur little or no bandwidth overhead for the management and control. Such a communication system efficiently transfers data as fast as possible without slowing down the system by having to transmit management and control signals in between the transmission of the actual data.

With such a high speed backplane a plurality of dedicated lines (communication paths) are strictly reserved for the transfer of data. Such a high speed backplane bus may include data signal lines, status signal lines, a retry signal line, a busy line, a plurality of slot select lines, a slot select acknowledgement line, a port not ready line, a port ready line, an election synchronization line and an arbiter active line. By each of the modules of a concentrator being able to communicate with all other modules of a concentrator over these lines, the modules are able to elect an arbiter who will individually select which module is to transmit. Then that active arbiter is able to select each of the modules in a uniform manner for transmission onto the datalines. This is all done without having to have large gaps in between actual data transmission, and without each module having to monitor a line to determine if it a collision has taken place. In this way the backplane bus, especially its bandwidth, is used in a most efficient manner without the drawbacks of collisions, a single module dominating the backplane or the existence of large gaps between actual useful data transmissions.

When a module is an active arbiter, it places a signal on the arbiter active line noting to other modules that the arbiter function is being provided by one of the modules. If for any reason an active arbiter can no longer function, the signal is removed from the arbiter active line. When a module notices that a signal is missing from an arbiter active line, or a module desires a new election for active arbiter, the module will place a signal on the election synchronization line and an election process is initiated. The active arbiter then issues the arbiter active signal and begins to select modules for transmitting onto the backplane in a "round robin" manner.

Backplane buses with such high speed modules function quite well with current modules. However, even with current modules, there can be the need to assign one module more of the high speed bus bandwidth than another. Further, newer modules require increasingly more bandwidth.

Newer modules require up to about 200 megabit/second bandwidth. Future modules may require much more bandwidth, for example as much as one gigabit/second bandwidth. The use of a round robin arbitration scheme, that gives each module equal priority for the high speed bus access, is necessarily problematic.

SUMMARY AND OBJECTS OF THE INVENTION

It is an object of the invention to provide a new arbiter that allows high speed modules higher priority for access to a high speed bus. Such new modules can be provided with a new arbiter which is programmed to insure that the module with the new arbiter wins the arbiter election process. By providing this arrangement, it is possible to assign different modules different bus access priorities.

According to the invention, the new arbiter is a table based arbiter, in which the contents of the table are defined by software. This allows for maximum flexibility in defining priorities and requires only that a very simple mechanism be implemented in hardware. The disadvantage of a table based arbiter (versus the known round robin arbiter) is the hardware storage required to hold the table, but this is offset by the reduced amount of hardware logic needed to implement the arbitration state machine.

The table may be implemented in the high speed bus interface chip as a special dual port RAM cell. The table may then be loaded with slot numbers by software. The arbiter logic simply cycles through the table and provides an output of the slot number in the current table location during the current arbitration cycle.

A problem with the table based arbitration mechanism is that it is difficult to change the table in an active arbiter without disrupting the arbitration sequence. The disruption occurs during the time it takes to update the table, which can be a significant amount of time since most changes require that the entire table be re-written. The disruption can cause modules to lose high speed bus bandwidth and to drop packets as a result. A solution to this problem is to use two arbitration tables. While one table is in use, the other can be updated. When the update is done, the new table becomes the active table. This minimizes the disruption of the arbitration sequence incurred by the single table approach, however, it still requires that the entire table be re-written.

It is a further object of the invention to provide a communication system with a high speed bus wherein access to the bus is controlled by an arbitration scheme using a linked list based table that minimizes the arbitration sequence disruption and also allows for table updates to be made without having to re-write the entire table.

According to the invention, a bus arbitration system is provided for determining a sequence for bus access between a number of modules connected to a bus, such as a concentrator backplane bus used for local area network applications. The system comprises memory means and write means (or read/write means) for building a table comprising entries. Each of the entries represents a module slot identification number. Each entry also has an entry link portion which links a given entry to another entry. The system also includes arbiter logic means for cycling through and reading or sequencing through the table from one entry to another entry based on the entry link portion. The arbiter logic means causes the memory to form an output of a current slot identification number, corresponding to the module which is to have access to the bus. With this system, the number of entries having a particular module slot identification number relative to the total number of entries in the table determines a proportion of access to the bus of the module having the particular module slot identification number.

The write means (hardware/software) also preferably includes means for updating the table including adding additional entries for changing a proportion of access to the bus. The updating means can also delete entries. The write means further can rewrite the table by deleting all entries and writing new entries to form a new table.

According to a further aspect of the invention, two different linked tables are provided, namely the write means forms two different tables, each table comprising entries. Each entry represents a module slot identification number and has an entry link portion linking one entry to another entry to form a sequence of entries. Arbiter logic means is provided for cycling through and reading the table in the sequence, from one entry to another entry based on the entry link position. An output is formed based on the current slot identification number which is to have access to the bus. In each table, the number of entries having a particular module slot identification number relative to the total number of entries determines a proportion of access to the bus of the module having this particular module slot identification number. The write means further includes means for updating a table by adding additional entries or by deleting entries. Further it can rewrite either table, preferably rewriting one table while allowing the arbiter logic means to sequence through or cycle through the table which is not being rewritten.

The linked list based table has the advantage over a two table non linked approach of allowing quick updates, but has the disadvantage of being new and requiring changes to existing software. Nevertheless, such quick updates present a desirable mechanism for allocating high speed bus bandwidth and allowing a quick revision to the allocation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 6a, 6b and 6c are schematic diagrams of the arbiter software data structures according to the invention;

FIGS. 8a, 8b and 8c each show an arbitration table implementation using a link list based table including variations to the table brought about by changes, including additions and deletions;

DESCRIPTION OF THE PREFERRED EMBODIMENT

Figure 1:
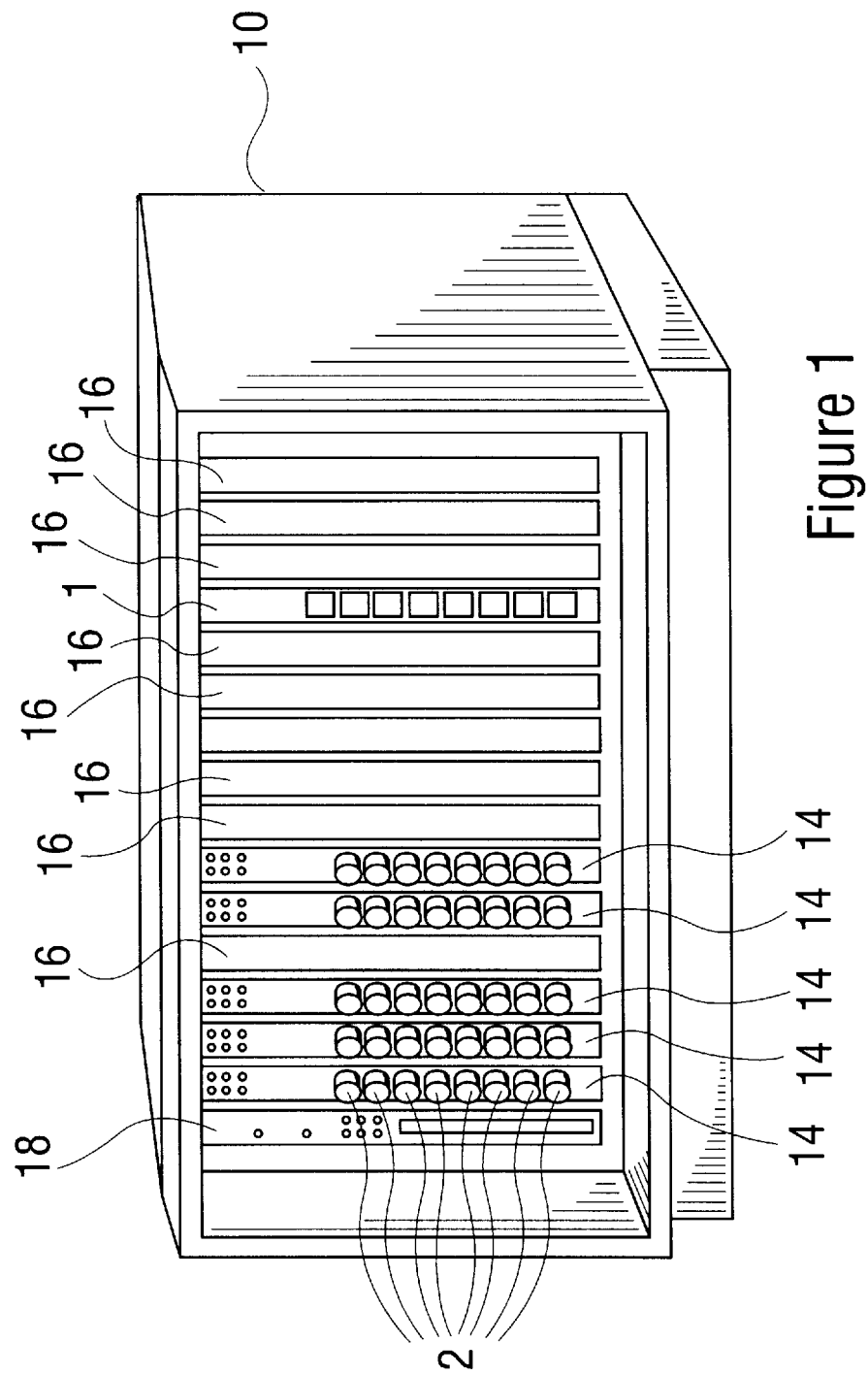
FIG. 1 is a perspective view of a concentrator containing several modules.
Figure 2:
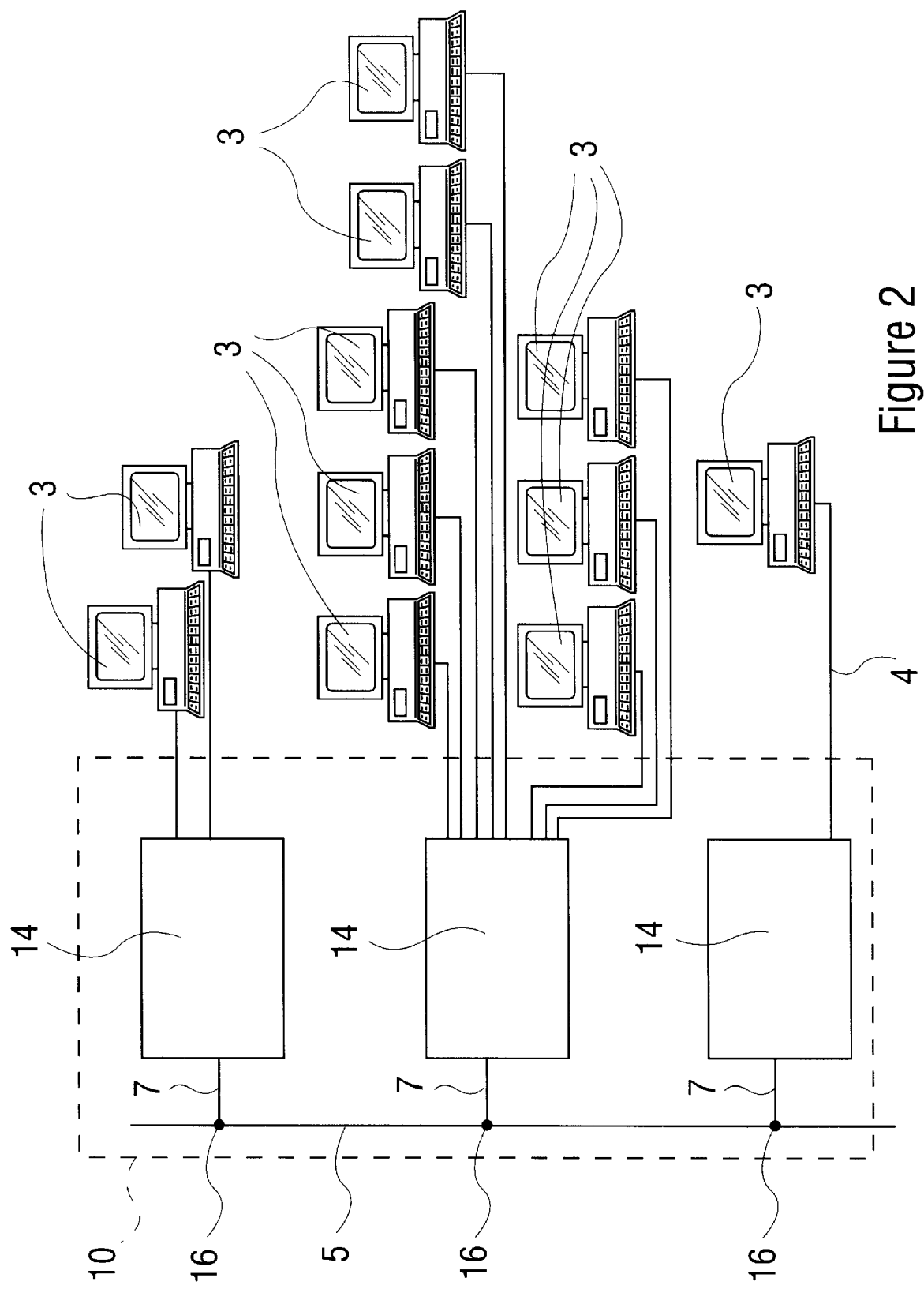
FIG. 2 is a schematic view of several work stations connected to modules of a concentrator.

Referring to the drawings in particular, FIG. 1 shows a concentrator 10 which contains a plurality of media modules 14 and a plurality of empty slots 16 which can be filled with modules. Each of the media modules 14 has a plurality of ports 2. As shown in FIG. 2, a plurality of stations 3 can be connected over cables 4 (or by other means) to the ports 2 of media modules 14. The concentrator 10 has a backplane bus 5, of which a portion is shown in FIG. 2. The backplane bus 5 connects the modules 14 to form a network such as a bus network or ring network. It is also possible to connect a plurality of concentrators to serve more users and to provide more than one network over the backplane of one concentrator. Two or more networks can be connected through bridge or router modules 1. In this way, the modules on several different concentrators can be connected to form a single network or users from different networks can be connected.

Each of the media modules 14 has a plug or tab 7 which plugs into one of the slots 16 of the backplane 5, as shown in FIG. 2. In this way all of the media modules 14 can communicate with each other. Other modules, such as power modules, management modules and/or control modules can be plugged into the slots 16.

In a concentrator 10, each of the slots 16 has an address or slot ID. The address or slot ID is used to determine which slot, or module in a slot, is being identified. This is done for such various purposes as indicating which module is transmitting, which module is to transmit next, and which modules are participating in an election of an arbiter. By each module in a slot asserting the proper signals on the corresponding lines at the proper time, management of a communication bus is possible at a high speed and in a very efficient manner.

Figure 3:
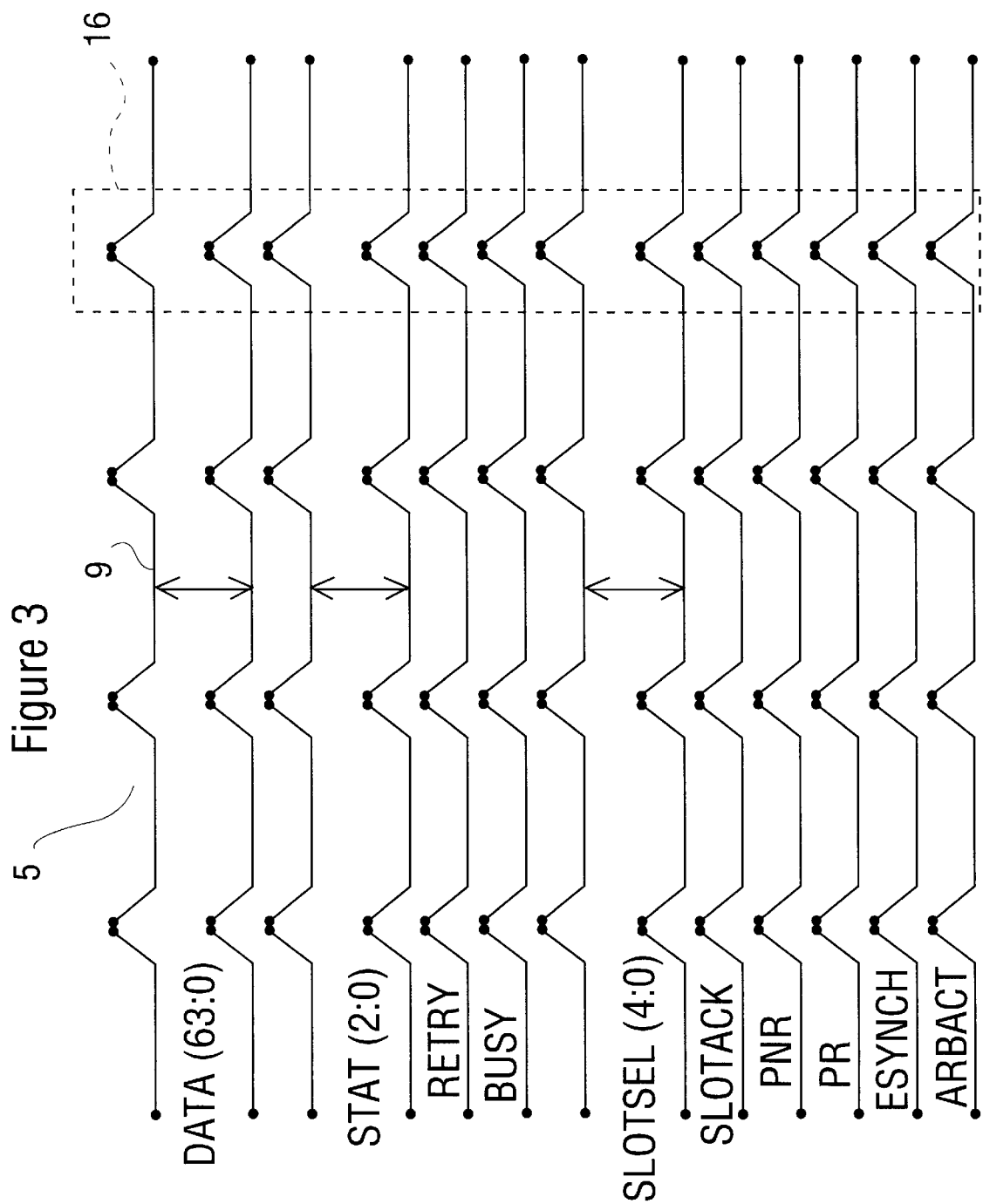
FIG. 3 is a schematic view of the lines of a backplane of a concentrator of the present invention.
Figure 4:
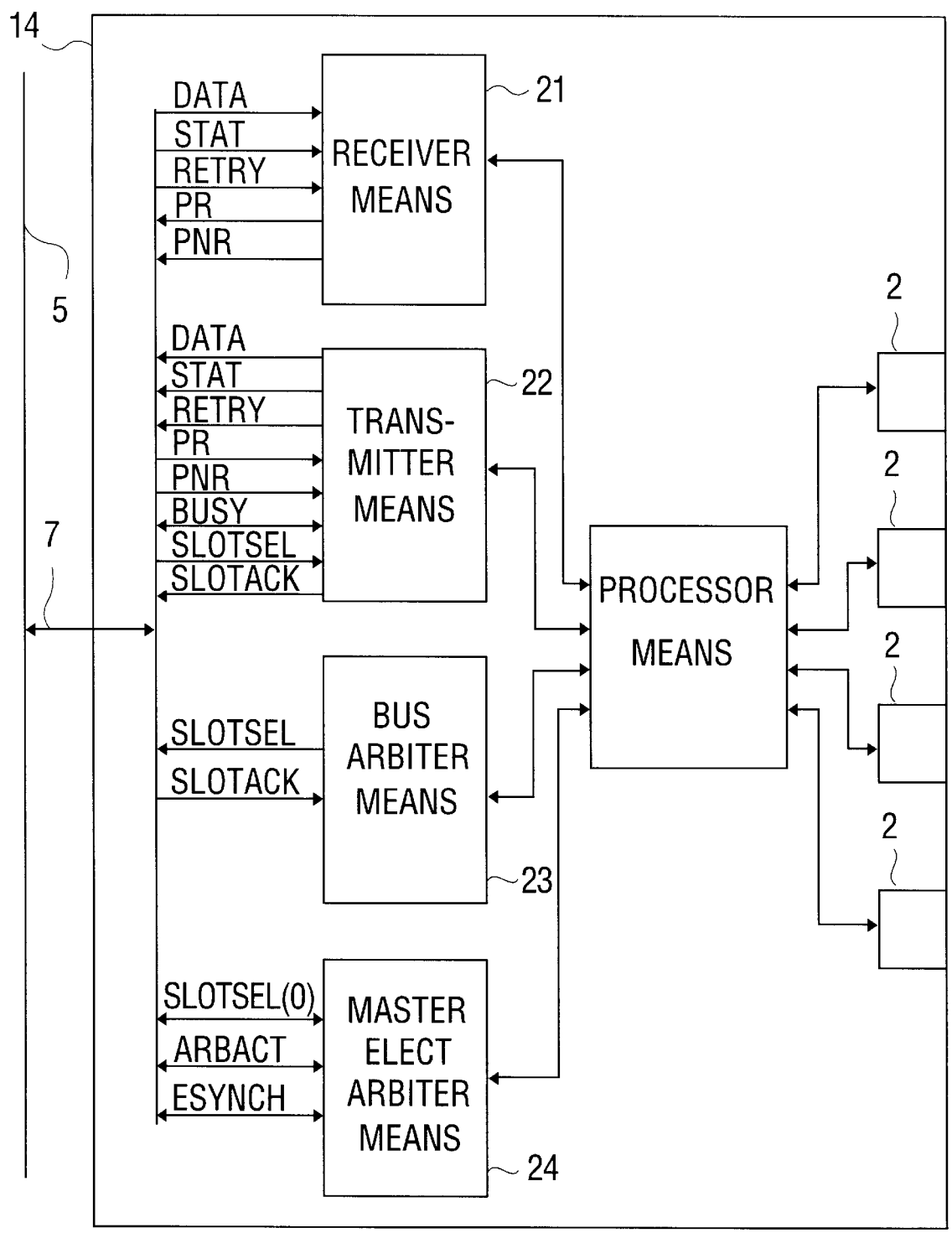
FIG. 4 is a schematic diagram of a module.

FIG. 3 shows the individual signal lines (communication paths) 9 that together form a bus, a portion of the backplane 5. In the preferred embodiment, there are a total of 79 signal lines 9. These 79 signal lines 9 can be organized into the following groups of signals.

DATA(63:0)
STAT(2:0)
RETRY
BUSY
SLOTSEL(4:0)
SLOTACK
PNR
PR
ESYNCH
ARBACT

The DATA group of signal lines is 64 lines wide. The actual data is transferred synchronously over all 64 lines at a rate of, for example 32, MHz. Data can be transmitted in bursts of a single packet. Provisions are available for multiple packet transfers in a single arbitration cycle. The first data transfer of each burst is the 64 bit header. The contents of the packet header are described in U.S. application Ser. No. 08/651,804, U.S. Pat. No. 5,781,745, the contents of which are hereby incorporated by reference. Subsequent transfers contain the packet data. The various other signals are also described in more detail in application Ser. No. 08/651,804, U.S. Pat. No. 5,781,745.

SLOTSEL (Slot Select) signals are driven onto the corresponding signal lines by the active arbiter and indicate which slot or module in that slot can claim the bus next. The arbiter system is a primary feature of this invention and the manner for assertion of these SLOTSEL signals is discussed below. The SLOTSEL(4:0) lines are used in conjunction with the SLOTACK signal to arbitrate successive bus masters. Preferably the SLOTSEL signals indicate the individual modules by transmitting the slot ID of the slot that the module is plugged into. A management bus keeps track of which slots contain modules and informs the modules of their slot ID.

The Slot ID is a five bit field used to uniquely identify each of the 17 slots in the preferred embodiment. On the module, the Slot ID is defined to be five bit binary codes for the numbers 0 through 16. Since the BTL drivers invert all signals for the backplane, the Slot ID is seen on the backplane as the one's complement of the numbers 0 through 16.

The SLOTACK (Slot Select Acknowledge) signal is asserted by a module in a slot that is claiming its arbitration slot for data transfer. It must be asserted on the first clock cycle in which the module of a slot sees its address on the Slot Select lines. By the time the active arbiter sees this signal, bit has already incremented the address signal on the Slot Select lines to the address of the next slot in the sequence. In response to the SLOTACK signal the arbiter will freeze the Slot Select lines at this point. The SLOTACK signal is de-asserted by a module at the same time that the module in a slot acquires the bus and asserts the BUSY signal. In the case where the module in a slot sees its Slot Select address appear and the bus is idle, the module in the slot will assert the BUSY signal to claim the bus and will not assert the SLOTACK signal to freeze the arbiter. In all cases, if the module in a selected slot has no data to transmit, it will not assert the SLOTACK signal. A module seeing its address on the slot select lines and seeing the SLOTACK signal asserted will not also try to assert SLOTACK, but instead will wait until SLOTACK is de-asserted.

The ESYNCH (Election Synchronization) signal is used by the arbiter portion of the modules to elect a master active arbiter. The ESYNCH signal goes active during the initiation of the election process and goes away when all potential arbiters are in synch for the election process. When each of the potential arbiters sees this signal asserted on the corresponding signal line, they respond by also asserting the signal, and then wait for a pre-determined amount of time before de-asserting it.

The ARBACT (Arbiter Active) signal is used by the arbiters to indicate that one of the arbiters is establishing itself as the active arbiter. This indicates the end of the election process. If this signal goes away for some reason, such as the module of the active arbiter is removed, then the remaining arbiters must initiate an election process by asserting the ESYNCH signal.

MODE OF BUS OPERATION

The first event that takes place in the operation of the bus is the election of the active arbiter. This is done using the ESYNCH, ARBACT and SLOTSEL signals. After the arbiter election is complete the active arbiter begins the linked list table based arbitration. During bus arbitration, the Bus Arbiter Means 23 of the module containing the active arbiter communicates with the Transmitter Means 22 of all modules (including its own) via SLOTSEL and SLOTACK. The bus arbiter means 23 drives a Slot ID on the SLOTSEL(4:0) lines and looks for a SLOTACK signal. If the module in the selected slot wants to gain mastership of the bus, this module has a Transmitter Means 22 which activates the SLOTACK signal and the active arbiter holds the SLOTSEL lines with the Slot ID of the next slot in the table (if two linked list tables are used one is the active table). Once a Transmitter Means 22 of a module in a slot has asserted SLOTACK and claimed the next available bus cycle, it must wait until the previous Bus Master has completed its data transmission. When the Transmitter Means 22 of a module has been granted the bus, it monitors BUSY. When BUSY is de-asserted it asserts BUSY and communicates with the Receiver Means 21 of one or more modules via DATA, STAT, RETRY, PR, and PNR. When the BUSY signal is de-asserted by the previous Bus Master, the Transmitter Means 22 of the module asserting SLOTACK can now become Bus Master by de-asserting SLOTACK, asserting BUSY and beginning to transfer data over the backplane using the DATA signal lines. At the end of the cycle, the Transmitter Means 22 releases the BUSY signal and allows the module in the next arbitrated and acknowledged slot to gain mastership of the bus. If a Transmitter Means 22 in a slot sees its Slot ID on the SLOTSEL lines and neither SLOTACK nor BUSY are asserted, then the Transmitter Means does not assert SLOTACK but it asserts BUSY and assumes control of the bus immediately. The arbiter is then free to increment the SLOTSEL lines and arbitrate for the next Bus Master. An arbiter election is described in application Ser. No. 08/651,804.

The active Bus Arbiter, once elected, performs a table based arbitration. The table based arbitration scheme allows any arbitration sequence anyone might desire, limited only by the size of the table. A preferred methodology for constructing the sequence is as follows: define two priorities of slots, high priority and low priority; for every occurrence of a low priority slot in the sequence there is an occurrence of each high priority slot. Thus, if slots 1 and 2 are high priority and slots 11, 12, and 13 are low priority, the sequence would look like this: 1, 2, 11, 1, 2, 12, 1, 2, 13. The arbiter repeats the sequence ad infinitum. This sequence would give slots 1 and 2 each one-third of the 2 gigabit/second of Gbus bandwidth (667 megabit/second) and slots 11, 12, and 13 each one-ninth of the 2 gigabit/second (222 megabit/second). Other priority schemes and bandwidth distribution arrangements are possible.

Once the table has been constructed, it will be necessary to add or delete slots from the table as modules are inserted into or removed from the hub. This is fairly easy for low priority slots just add or delete the consecutive entries for all high priority slots and the one low priority slot. It is a little more work for high priority slots—you have to go through the table and add or delete the entry for the high priority slot corresponding to each low priority slot.

One advantage of the table based mechanism is that it is possible to fine tune the high speed bus bandwidth allocation by adding or deleting entries in the arbitration sequence. For instance, in the previous example, if the two high priority slots, 1 and 2 are to have, more bandwidth one could give them each an additional entry in the table. The sequence would then look like this: 1, 2, 11, 1, 2, 12, 1, 2, 13, 1, 2. This sequence would give slots 1 and 2 each 4/11 of the 2 gigabit/second of the high speed bus bandwidth (727 megabit/second) and slots 11, 12, and 13 each 1/11 of the 2 gigabit/second (1 82 megabit/second).

As soon as the active Bus Arbiter becomes active and asserts the ARBACT signal, the active Bus Arbiter also drives the Slot ID of the module at a first address of the table on the SLOTSEL lines. The Bus Arbiter holds the Slot ID there for three clock cycles and then increments the Slot ID to the next slot in the table. It then holds this Slot ID active for three clock cycles. If the module in the first slot had a packet ready to transmit when it first observed its Slot ID and the BUSY signal was asserted, it would have asserted SLOTACK on the next clock cycle. The SLOTACK signal would then make it back to the Bus Arbiter on the third clock cycle of broadcasting the second Slot ID. If the Bus Arbiter sees SLOTACK asserted, it does not increment the SLOT-SEL lines to the third slot. From this point forward, the Bus Arbiter moves to the next table entry whenever SLOTACK is not active and the current Slot ID has been broadcast for a duration of three clock cycles. Note that whenever a module in a slot asserts SLOTACK and claims the next available bus mastership, the Bus Arbiter is held pointing to the next slot in the table sequence. The next module will not assert its SLOTACK until it sees the current slot release it.

A Transmitter means of a module in a slot can only assert its SLOTACK signal on the first cycle in which it sees its Slot ID on the SLOTSEL lines and the SLOTACK signal not asserted. If it misses this opportunity (a packet doesn't arrive from a workstation to the module until the second or third cycle) then it must wait for the Bus Arbiter to again arrive at a table entry with that module slot ID.

Once a module asserts the SLOTACK signal, it has reserved the next cycle on the bus. It monitors the BUSY signal to see when the current bus master is ready to release the bus. On the first clock cycle that it sees BUSY de-asserted, it re-asserts BUSY, assumes mastership of the bus, and de-asserts SLOTACK to allow for the Bus Arbiter to begin the selection of the next bus master. Note that BUSY is actually de-asserted by the current bus master during the last three clock cycles of the data transfer. Due to the pipelining of the control signals, the new bus master can assume control of the bus immediately and still not overlap the previous data cycle.

In the case where a module in a slot sees its Slot ID appear on the SLOTSEL lines and not only is SLOTACK not asserted but the bus is idle and BUSY is not asserted, the module in the slot will assert BUSY, assume mastership of the bus immediately and it will not assert SLOTACK. The Bus Arbiter will proceed on with arbitration for the next bus cycle.

In the same cycle that the bus master gains access to the bus with the BUSY signal it can begin data transfer. The bus master puts the header on the DATA lines and the "Header Cycle" signal or encoding on the STAT(2:0) lines. If the master is not ready to transmit the header on the first clock cycle in which it asserts BUSY, it can put the "Bus Idle" signal or encoding on the STAT(2:0) lines until it is ready. Note that if the bus is not driven at all, the STAT lines will "float" to the "Bus Idle" state. After the header, data is transferred every clock cycle until the packet is complete. While the data is being transmitted, the STAT(2:0) lines are driven with the "Data Cycle" encoding or signal. During the last three transfers of a data packet, the BUSY signal is de-asserted and the STAT(2:0) lines are driven to the "End of Cycle" values. This permits the next bus master to make preparations to drive its header onto the bus with potentially no idle cycles in between transfers.

It should be noted that there is a provision for a slot to transmit more than one packet when it assumes control of the bus. This is called data transfer with chaining. To do this the slot should transmit the "Header Cycle with Chaining" encoding or signalling on the STAT(2:0) lines during the header cycle of each packet until the header cycle of the last packet in the packet chain. Also, the slot must not de-assert BUSY until three cycles before the end of the last packet.

The present invention also has means for accommodating high-speed and low-speed modules. Both high and low-speed modules can be incorporated into the same concentrator system of the present invention and the high and low-speed modules can communicate with each other. In this dual speed operation, the high-speed modules transfer one 64 bit word of data each clock cycle during packet transmission. Slow speed modules transfer one 64 bit word of data every two clock cycles during packet transmission. Each module is programmed by a management process with information as to which modules are high-speed and which modules are low-speed. High-speed modules are capable of transmitting and receiving data at both high-speed and low-speed. Low-speed modules only transmit and receive at low-speed. When a high-speed module has a packet to transmit, it checks to see if any destination modules are low-speed. If so, it sets a bit in the packet header to indicate low-speed transmission and transfers the header and data at a rate of one word every two clock cycles. If all the destination modules are high-speed, the transmitting module sets this speed bit to indicate high-speed transmission. The transmitting module transfers the header for two clock cycles, since all modules must read the header. The transmitting modules then transfers the remainder of the packet at a rate of one word every clock cycle. Low-speed modules always set the header bit to indicate low-speed transmission and transmit header and data at the rate of one word every two clock cycles.

Figure 5:
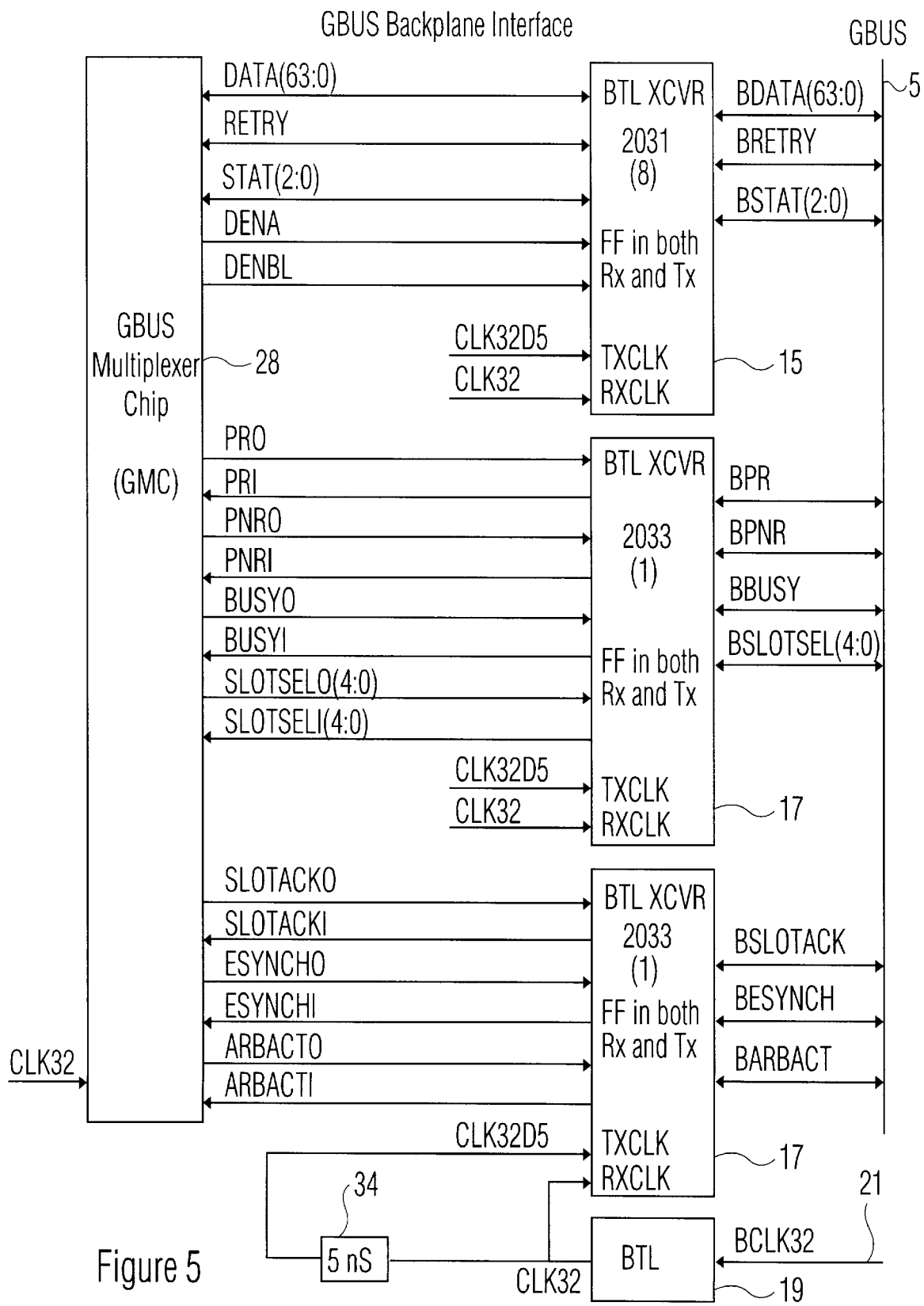
FIG. 5 is a schematic diagram of the bus interface of the present invention.

FIG. 5 is a schematic diagram of the bus interface. All the slots in the concentrator in addition receive a 32 MHz BTL clock signal 31 from the backplane. This clock signal 31 is source at the center of the backplane by the hub's controller card and driven to both ends of the backplane where it is preferably terminated with 33 ohms. Each module receives this BTL clock signal 31 and creates a 5 nS, nominal, delayed version of it. All data, control, and arbitration signals are clocked onto the bus from a FB2031 or FB2033 BTL transceiver 15, 17 using the delayed version of the 32 MHz clock. All of these signals are subsequently clocked off of the bus with FB2031 or FB2033 BTL transceivers 15, 17 using the undelayed 32 MHz clock. The reason for clocking data onto the bus with the delayed clock is to guarantee hold time for the data from the previous cycle.

The critical components in the timing analysis of the Bus are the backplane itself, the CD3204 BTL transceiver 19 used to buffer the 32 MHz clock from the backplane, the 5 nS delay line 34, and the timing characteristics of the FB2031/FB2033 transceivers 15, 17. The DATA(64:0), STAT(2:0), and RETRY signal lines all use the FB2031 devices 15 and the remaining control signal lines use the FB2033 devices 17.

ARBITRATION TABLE IMPLEMENTATION USING A LINKED LIST BASED TABLE

A linked list based arbitration table is used according to the invention. In this case each table entry has a link to the next table entry. This allows the table to be updated gracefully, without the disruption of rewriting the table as with a sequential arbitration table. It also allows many changes to the table to be done very quickly.

The linked list based arbitration table requires each table entry to have a link to the next entry. Instead of the arbiter sequencing through the table going from address n to n+1, to n+2, etc., the address of a succeeding entry is contained in the current entry. For a table of length 64, this requires each entry to have an extra six bits to hold the address of the next entry. The end of table flag that is needed in a sequential arbitration table is not employed. The advantage of using a linked list based arbitration table is that it enables table updates to happen quickly, without disrupting the arbitration sequence.

Referring to FIGS. 6a, 6b and 6c, an arbitration table is shown based on two high priority slots, 1 and 2, and three low priority slots, 11, 12, and 13.

Considering the case where there is a need to increase the priority of the high priority slots. The changes to the table are highlighted in FIG. 6b.

First, addresses 9 and A are written, and then address 8 is re-written, updating the link field only. Next considering the case where there is a need to remove slot 12 from the table. This involves removing the entry for slot 12 as well as the two corresponding entries for the high priority slots as shown in FIG. 6c.

The only change to the table is to change the link field at address 2. Note that while the operation of increasing the bandwidth of slots with the linked list is much the same as with the sequential table, the operation of removing a slot is much simpler. This operation in the sequential table involves re-creating the whole table from scratch.

There are a few simplifications that can be made to the linked list table to make its use easier to implement. First, assume that all links will point in a single direction (also referred to as forward). This means that it is closer to the sequential table in that there is no jumping back and forth. It is different than the sequential table in that there can be holes in the table. Second, assume that the operations of adding and deleting low priority slots, deleting high priority slots, and increasing and decreasing bandwidth are done by adding entries and/or adjusting links. To add a high priority slot (and maintain a sequence like that described earlier) requires that the entire table be re-created, since this is the one operation that would violate the rule of all links pointing forward.

Other assumptions are that additions (low priority slots, increased bandwidth) are always made at the end of the table. Bandwidth decreases are made starting at the end of the list.

For fault tolerance purposes it is advisable to initialize the link field of all unused entries to zero and assume that this arbiter's slot is a high priority slot and is in location zero of the table. Thus, location zero should never be deleted, and if the arbiter somehow gets off to an unused portion of the table, it will soon get back on track.

Software needs to maintain a list of all high priority slot numbers (with this arbiter's slot number first). Associated with each slot number is a count of bandwidth adjustments. This count starts at zero and is incremented for each bandwidth increase and decremented for each bandwidth decrease. The count can be positive or negative. A list of low priority slot numbers and associated bandwidth adjustment count is also maintained. The bandwidth adjustment count for low priority slots is assumed to be non-negative, since decreasing the bandwidth would effectively delete the slot. Software also needs to keep the address of the last entry in the table and a copy of the table itself. The software copy of the table contains a back link field in addition to the slot number and link fields contained in the hardware table. This makes the linked list a doubly linked list and aides in traversing the list for maintenance operations.

ARBITRATION TABLE IMPLEMENTATION USING TWO LINKED LIST BASED TABLES

Two linked list based tables have the advantage of both the two table approach and the linked list based table approach. The advantage of the two table approach versus the linked list based table approach is that since all changes are made by re-creating the entire table, there only needs to be one software routine for all table operations. The advantage of the linked list based table approach is that most of the operations to update the table can be performed with just a few processor operations, resulting in the operation being completed more quickly than if the entire table is being written. Software can initially be written to use the two table mechanism, but can later become more sophisticated and use the linked list based table mechanism to enhance system performance.

One feature of the two linked list based table mechanism that is different from the other mechanisms has to do with when the switch between active tables takes place. The "end" of the arbitration sequence, where the switch between tables always takes place, is defined as the table entry that has a link field of zero.

Figure 7:
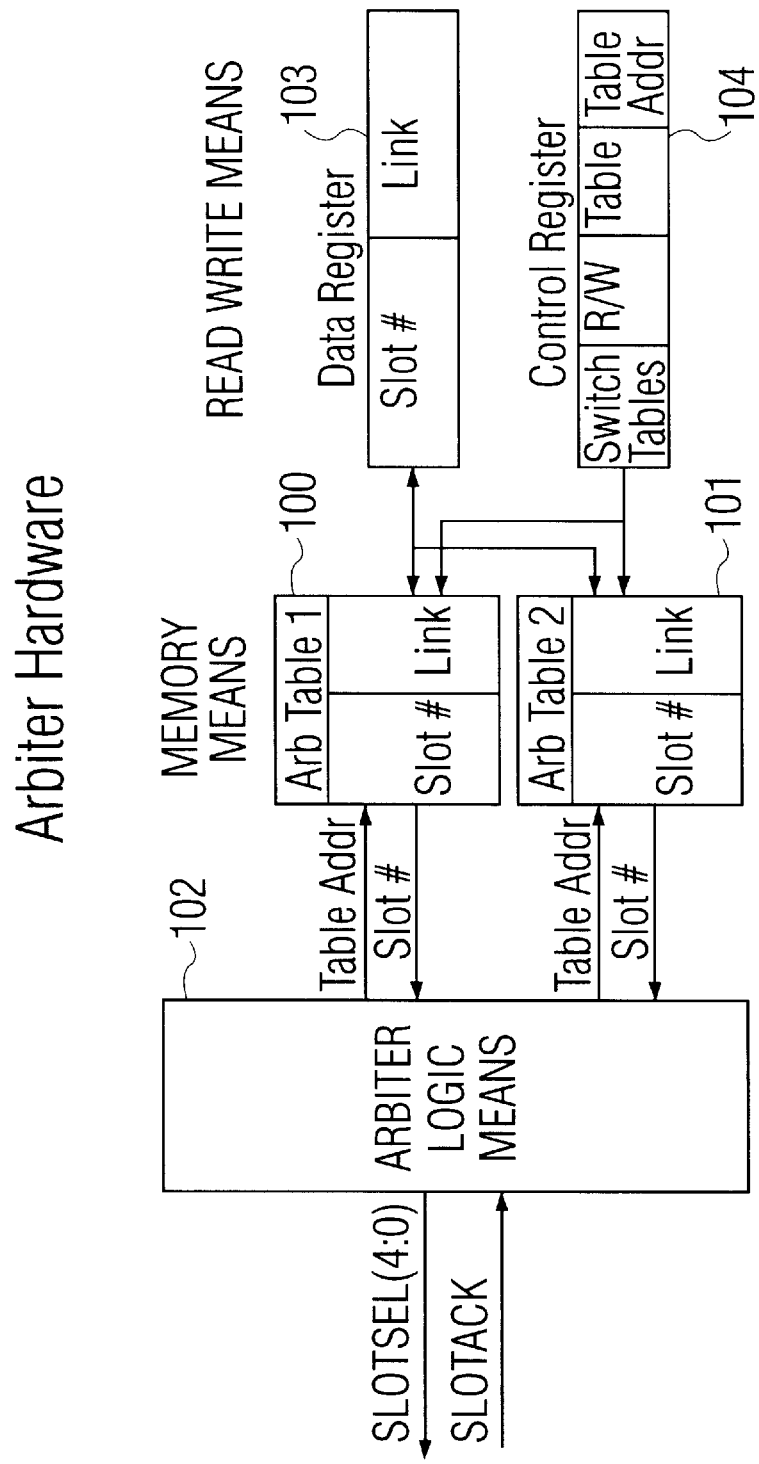
FIG. 7 is a schematic diagram of the arbiter hardware structure according to the invention.

To create a table, the software must first determine an initial arbitration sequence. Assuming that the sequence is based on two priorities of slots, namely high priority and low priority (obviously other priorities and various ratios of bandwidth use may be provided), for every occurrence of a low priority slot in a sequence there may be provided an occurrence of each high priority slot. As shown in FIG. 7, the processor writes the data register 103 with the slot identification number (slot#), and the link to be written to the Arb Table 100. It then writes the control register 104 with the read/write ("R/W") control bit set to zero to indicate a write, the Arb Table ("Table") bit set to indicate which table to write to, and the "Table Addr" field set to the Arb Table address of the entry being written. Writing the control register is what actually causes the write to the table to be performed. In the similar manner, the software writes succeeding memory locations with arbitration sequence entries, incrementing the address each time. In the case where the processor is creating the entire table from scratch, it will write to the inactive table. In this case, for the last write, the processor sets the "Switch Tables" bit to one. Then, when the arbiter logic means 102 reaches the last entry in the table, which is defined as the entry with a link field of zero, it switches tables for the next arbitration cycle.

PROCEDURE FOR CREATING ARBITRATION TABLE

The preferred form of the invention involves creating a linked list arbitration table. This process may also be used for creating an additional linked list arbitration table so as to provide an active linked list arbitration table and an inactive or reserved linked list arbitration table.

Software is provided for creating the link list based arbitration table. The software maintains several data structures. In the example with reference to FIGS. 9a–FIG. 12, procedures are provided for the arbitration system according to the invention based on a concentrator or hub having 17 module slots. In this situation, it can be a maximum of 17 high priority slots and a maximum of 16 low priority slots (the slot with the arbiter is assumed to be high priority). The various data structures are referred with reference to FIGS. 8a–8c with regard to the preferred procedure of the FIG. 9a–FIG. 12.

The HP Slot Number list 200 is a list of slot numbers of all high priority slots in the hub. This list contains from one to seventeen entries (for a seventeen slot hub).

The HP BW Adjust list 201 is a list of bandwidth adjustment counts corresponding to the slot numbers in the HP Slot Number list. A high priority bandwidth adjustment count can be positive or negative. It is incremented each time the slot has bandwidth added and decremented each time it has bandwidth decreased.

The HP Index 202 is a variable containing the values 0 through 16. It is used to index both the HP Slot Number list 200 and the HP BW Adjust list 201.

The LP Slot Number list 210 is a list of slot numbers of all low priority slots in the hub. This list contains from one to sixteen entries (for a seventeen slot hub). Since it is assumed that this arbiter is in a high priority slot, there will not be seventeen low priority slots.

The LP BW Adjust list 211 is a list of bandwidth adjustment counts corresponding to the slot numbers in the LP Slot Number list 210. A low priority bandwidth adjustment count can only be non-negative. Since a low priority slot starts with only one entry in the arbitration table, a negative adjustment would delete it from the table. The bandwidth adjustment count is incremented each time the slot has bandwidth added and decremented each time it has bandwidth decreased.

The LP Index 212 is a variable containing the values 0 through 15. It is used to index both the LP Slot Number list 210 and the LP BW Adjust list 211.

The End Address 226 is a variable containing the address of the last entry in the table. It is initially computed in the create table procedure and is maintained by the other procedures.

The Arb Table 220 is the arbitration table. It is a linked list containing from one to sixty-four entries. A copy of the table is maintained by software and the actual table used by the arbiter resides in memory in the high speed bus interface chip 28 (see FIG. 5). Software maintains one copy of the table regardless of whether the hardware has one or two tables. As shown in FIG. 8c, each software Arb Table 220 entry consists of three fields: Slot Number 221, Link 222 and Back Link 223. Link 222 contains the address of the next entry in the Arb Table 220. Back Link 223 contains the address of the previous entry in the Arb Table 220. The hardware Arb Table 100 (or 101) corresponds exactly to the software Arb Table, except that it does not contain the Back Link field.

Table Addr 225 is a variable containing the values 0 through 63. It is used to address the Arb Table 220.

The arbitration table procedures also make use of temporary variables such as Table Size, Adjust Count, and Saved Table Addr. Whenever anything is written to the software Arb Table 220, the same thing (minus the Back Link field) is written to the same location in the hardware Arb Table 100 (or 101). The following procedures do not explicitly show the writes to the hardware table. It should be assumed that any time the software table is written the hardware table is also writing.

It is possible to overrun the table (have more than sixty-four entries) when creating or updating the table. If this occurs during a table update, then the table must be re-created. If it occurs during a table creation, then some bandwidth adjustments should be eliminated and/or some high priority slots should be called low priority slots. In an actual hub it is expected that the number of high priority slots will be small and that an overrun during table creation will be rare.

In the flow diagrams of FIGS. 9a–12, the notation '<=' is used to indicate an assignment, that is, "a<=b" means that a is assigned the value of b. Parenthesis are used to indicate a specific table or list item, that is, Table (Index) indicates the table entry pointed to by Index, e.g. Arb Table (Table Addr).

PROCEDURE FOR CREATING ARBITRATION TABLE

Figure 9A:
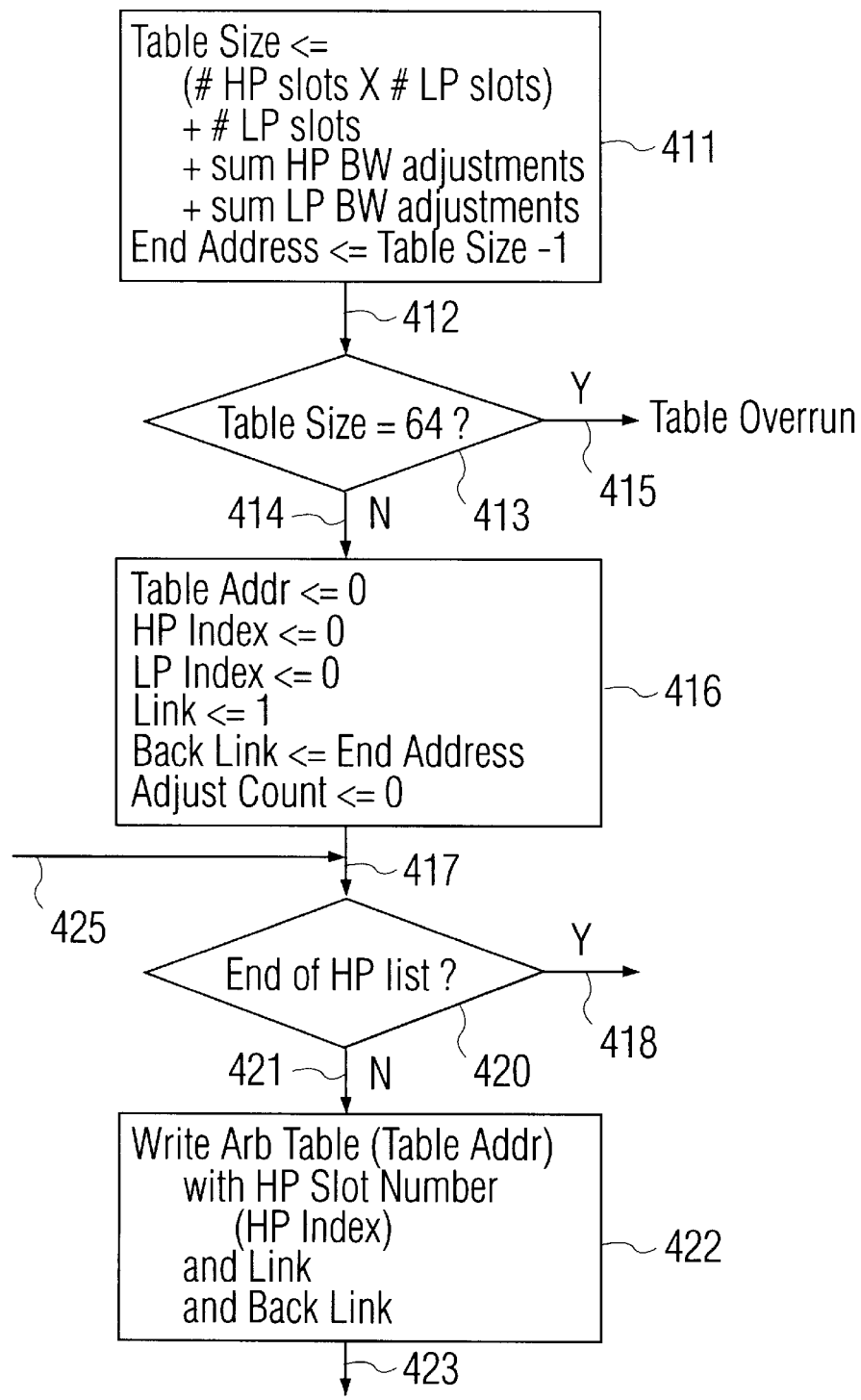
FIGS. 9a, 9b, 9c, 9d 9e and 9f are portions of a flow diagram showing the procedure to create an arbitration table according to the invention.
Figure 9B:
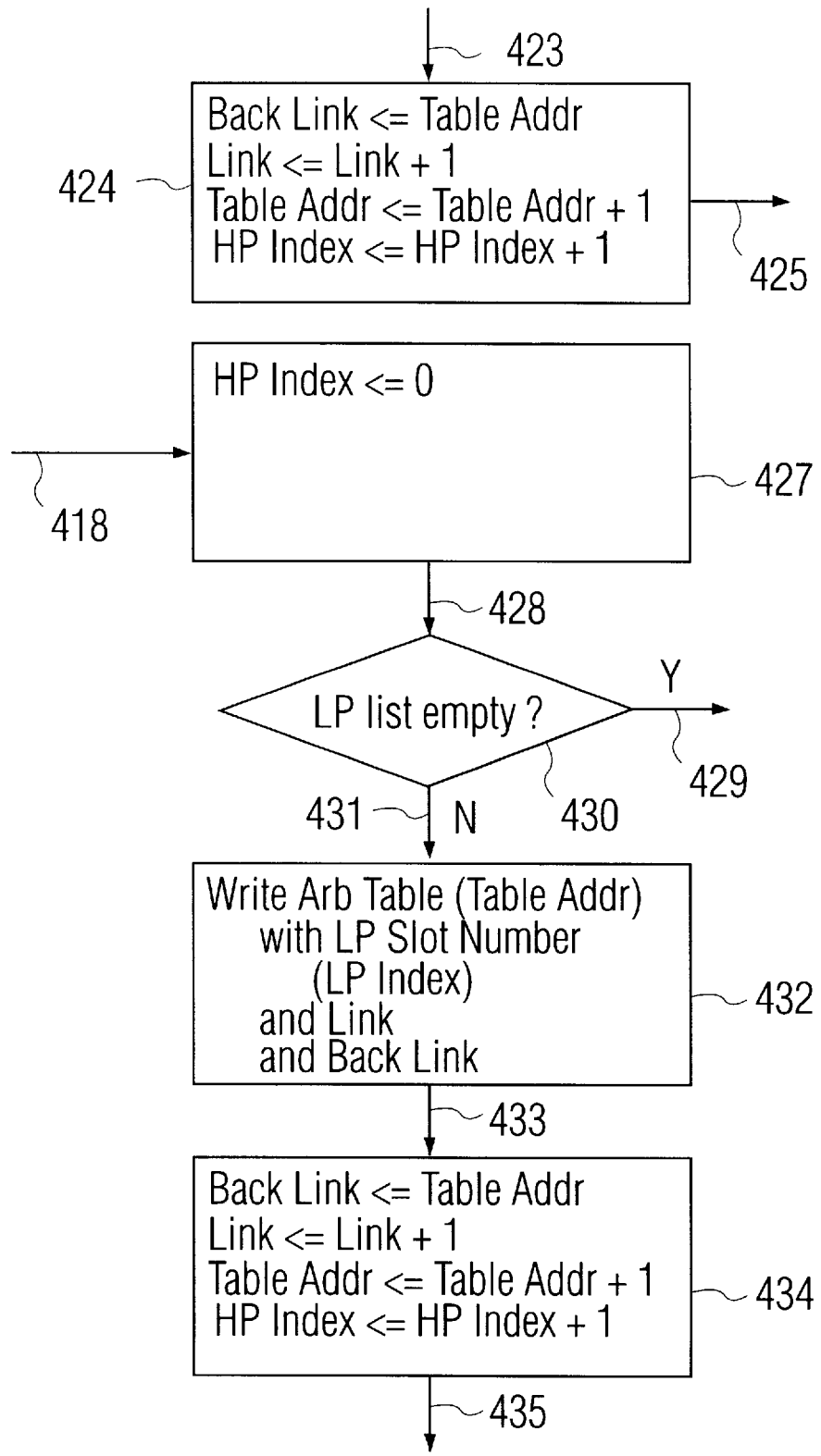

As shown in the attached FIG. 9a, the arbitration table creation procedure starts at step 411. The table size is assigned the value based on total number of HP slots times the total number of LP slots and this product is added to the number of LP slots and added to the sum of HPBW adjustments and added to the sum of the LPBW adjustments. The end address is then assigned to the table size above minus one (one less than the table size). The procedure proceeds at 412 to the next step 413 wherein the resulting table size is evaluated to determine if it is over 64 entries. If it is over 64 entries, a table overrun situation has occurred as it indicated at 415. As noted above, such an overrun situation results in a recreation of the table or bandwidth adjustments are eliminated and/or high priority slots are downgraded to low priority slots.

The procedure continues at 414 to step 416 wherein the Table Addr is set to zero, the HP index is set to zero, the LP index is set to zero, the Link is set to one, the Back Link is set to the End Address and the Adjust Count is set to zero. The process then proceeds at 417 to the step 420 wherein it is considered whether the end of the HP list has been reached. If the end of the HP list has not been reached, the procedure continues at 421 to step 422 including the writing of the Arb Table 220 (Table Addr) with HP Slot Number (HP index) as well as the Link and the Back Link. That is, the link information is the address of the next entry in the arbitration table and the Back Link information contains the address of the previous entry in the arbitration table. The procedure continues at 423 to step 424 where the Back Link is set to the Table Addr, the Link is set to the Link plus one, Table Addr is set to the Table Addr plus one and the HP index is set to the HP index plus one. The procedure then continues at 425 and continues at 417 back to step 420. The procedure again considers at 420 whether the end of the HP list has been reached. If the end of the HP list has been reached, the procedure continues at 418 to step 427 (see FIG. 9b) wherein the HP index is set to zero. The procedure continues at 428 to step 430 wherein it is considered whether the LP list is empty. If the LP is not empty, the procedure continues at 431 to step 432 including the writing of the Arb Table 220 (Table Addr) with low priority slot number (LP index) and the Link and the Back Link. The procedure continues at 433 to step 434 wherein the Back Link is set to the Table Addr, the Link is set to the Link plus one, the Table Addr is set to the Table Addr plus one and the LP index is set to the LP index plus one. The procedure continues at 435 to 436 wherein it is considered if the end of the LP list has been reached.

Figure 9C:
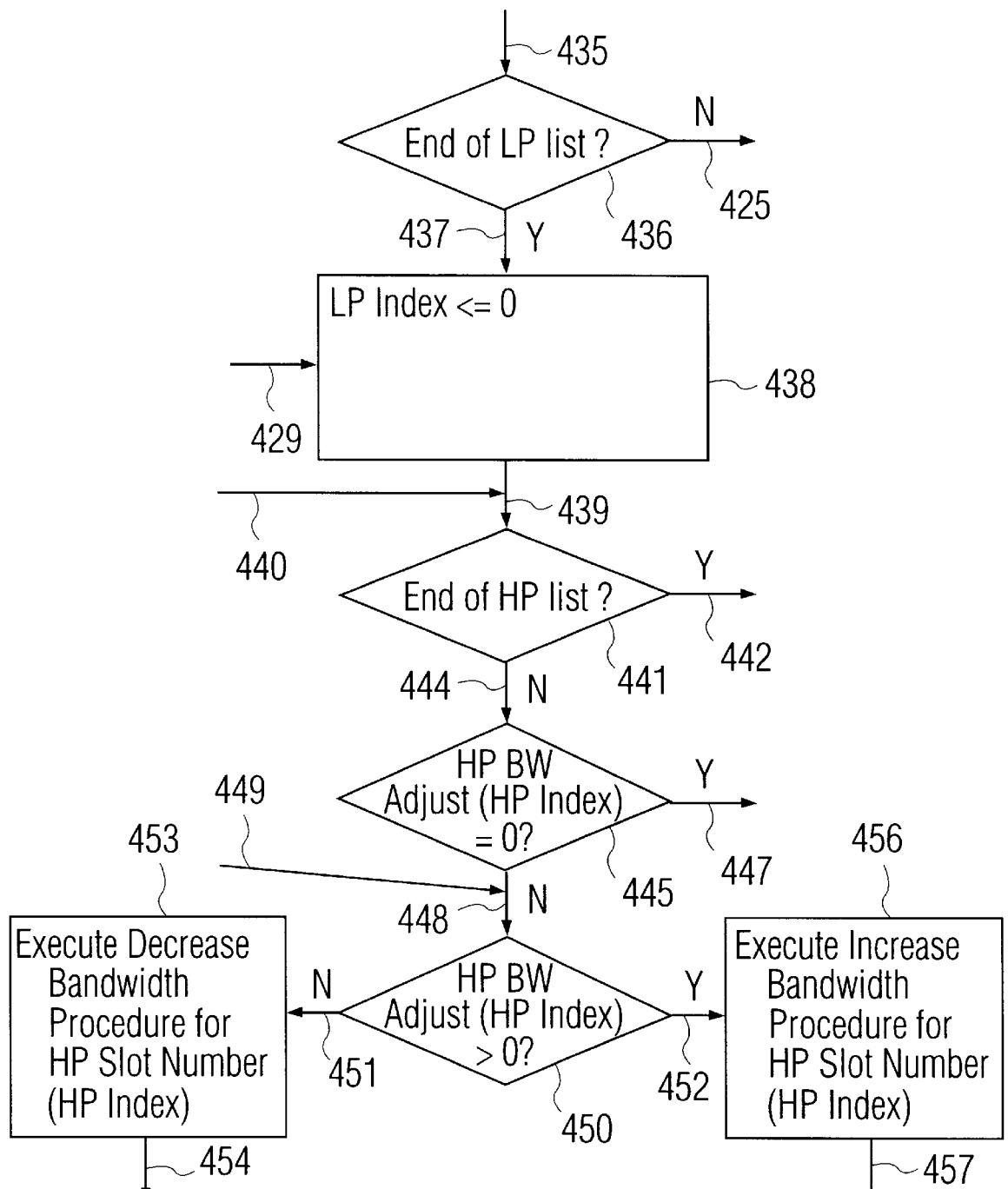
Figure 9D:
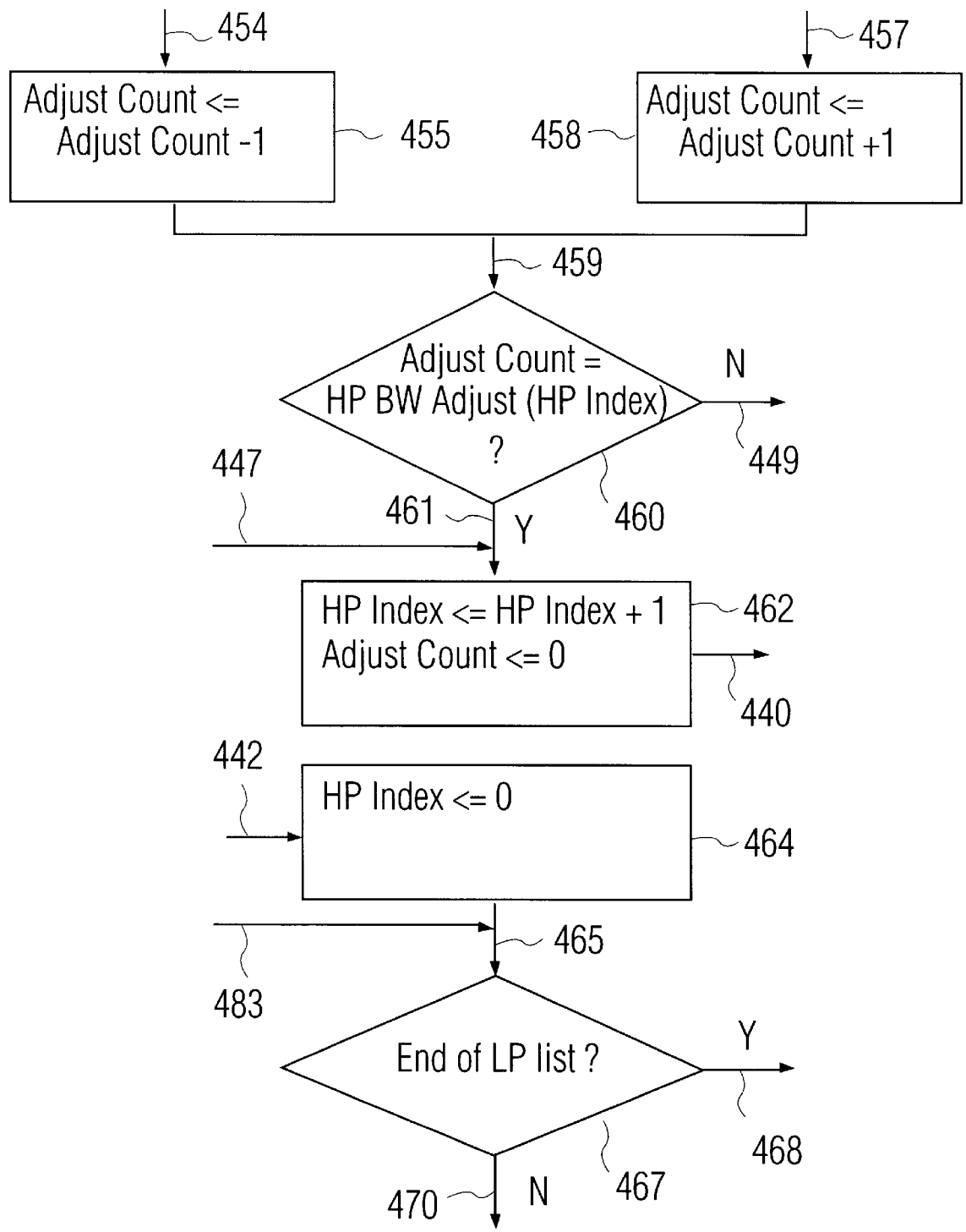

If the end of the LP list has been reached, the procedure continues at 437 to step 438 (see FIG. 9c). The LP index is set to zero at step 438 and the procedure continues at 439 to step 441 wherein it is again considered whether the end of the HP list has been reached. If the end of the HP list has not been reached, the procedure continues at 444 to step 445 wherein the HP BW adjust list 201 from the HP index 202 is evaluated. If HP BW adjust list 201 is not equal to zero, the procedure continues at 448 to step 450 wherein it is considered whether the HP BW adjusts (HP index) is greater than zero. If it is not greater than zero, the procedure continues at 451 to step 453 wherein a decrease in bandwidth procedure is executed for the HP slot number (the HP index). With this completed the procedure continues at 454 to 455 wherein the adjust count is set to the adjust count minus one. The procedure then continues at 459 to step 460. If at step 450 the HP BW Adjust (HP index) is greater than zero, the procedure continues at 452 to step 456 wherein an increase bandwidth procedure for the high priority slot number (HP index) is executed. With this accomplished, the procedure continues at 457 to step 458 wherein the adjust count is set to the adjust count plus one. The procedure then continues at 459 to step 460.

Figure 9E:
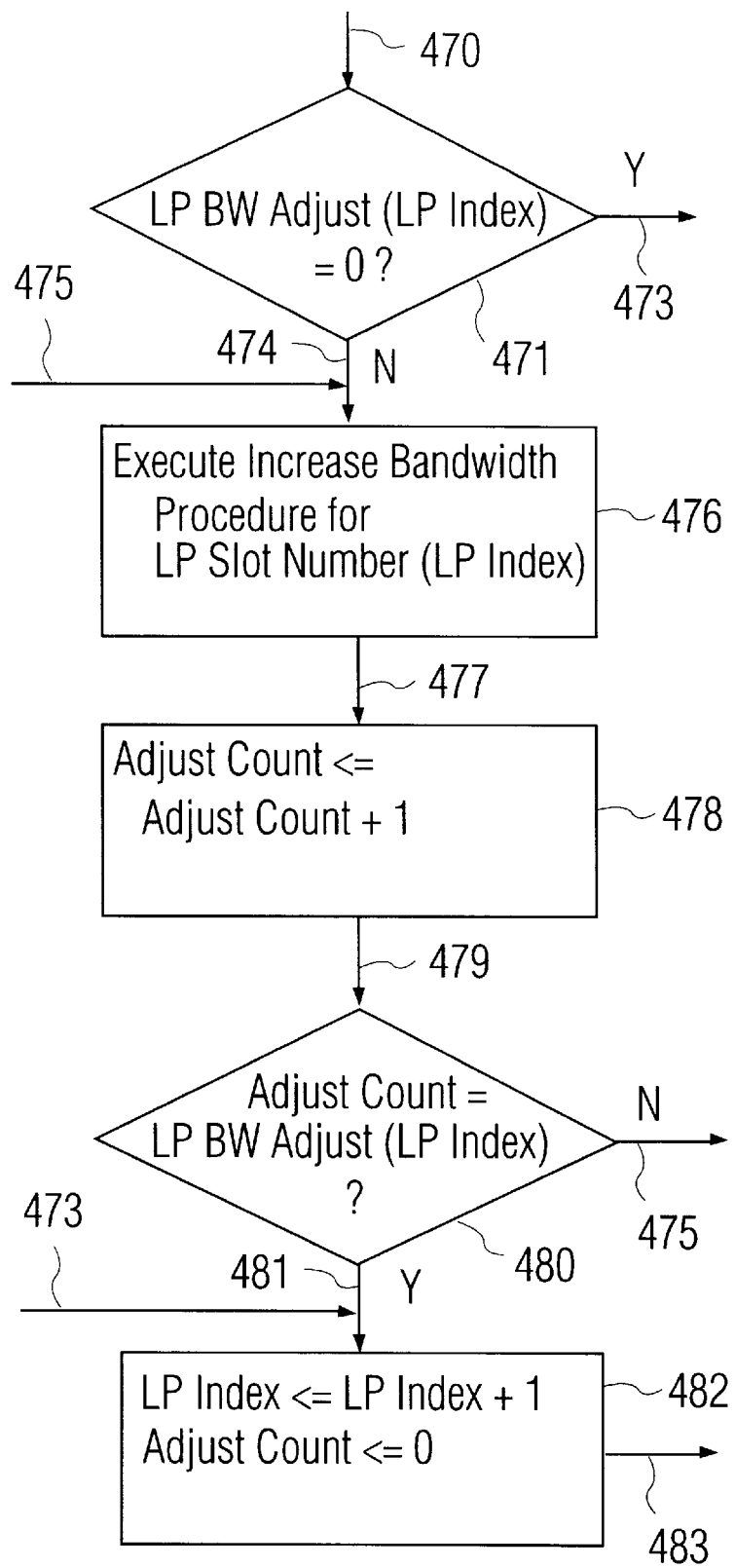
Figure 9F:
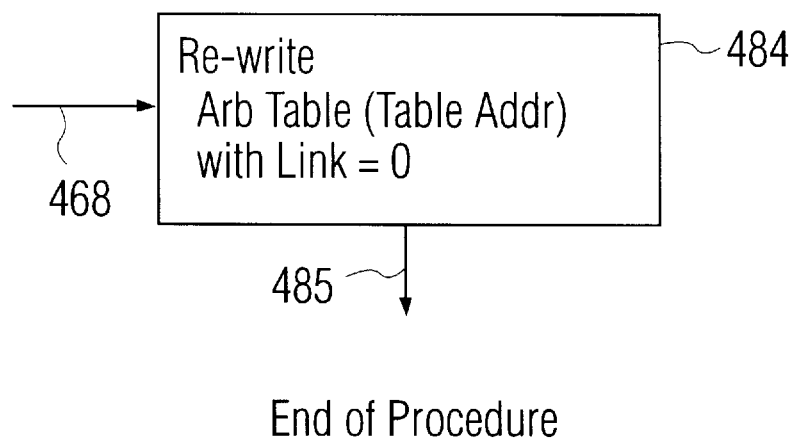

At step 460 it is evaluated whether the Adjust Count is equal to the HP BW adjust (HP index). If it is, the procedure continues at 461 to step 462 wherein the HP index is set at the HP index plus one and the Adjust Count is set at zero. The procedure then continues at 440 to 439 and back to step 441 wherein it is again evaluated whether the end of the HP list has been reached. If it has not been reached, the procedure again continues at 444 to step 445 wherein it is again evaluated whether the HP BW Adjust (HP index) is zero. If it is zero the procedure continues at 447 and 461 to step 462 wherein the HP index is set for the HP index plus one and the adjust count is set to zero. The procedure then continues at 440 and 439 back to step 441. If the end of the HP list has been reached, the procedure continues at 442 to step 464 (see FIG. 9d). The HP index is set to zero and the procedure continues at 465 to step 467. At step 467, the LP list is checked to see if the end of the LP list has been reached. If it has not been reached, the procedure continues at 470 to step 471 wherein it is evaluated whether the LP BW Adjust (LP index) is equal to zero (FIG. 9e). If it is not equal to zero, the procedure continues at 474 to step 476 which involves the execution of an increase in bandwidth procedure for the LP slot number (LP index). With this completed, the procedure continues at 477 to step 478 wherein the Adjust Count is set at the Adjust Count plus one. The procedure continues at 479 to step 480 wherein it is evaluated whether the Adjust Count is equal to the LP BW adjusts (LP index). If it is equal, the procedure continues at 481 to step 482 wherein the LP index is set to the LP index plus one and the Adjust Count is set to zero. The procedure then continues at 483 and 465 back to step 467 (see FIG. 9d). At step 480 if the Adjust Count is not equal to the LP BW adjust (low pass index) the procedure continues at 475 to 474 and back to step 476.

If at step 467 (FIG. 9d) the end of the LP list has been reached, the procedure continues at 468 to step 484 (see FIG. 9f) with a rewrite of the Arb Table (table address) with link equal to zero. The procedure is then ended. This last entry is namely a link back to the beginning of the table (the link to the address zero).

PROCEDURE TO ADD A LOW PRIORITY SLOT OR INCREASE BANDWIDTH FOR A SLOT

Figure 10:
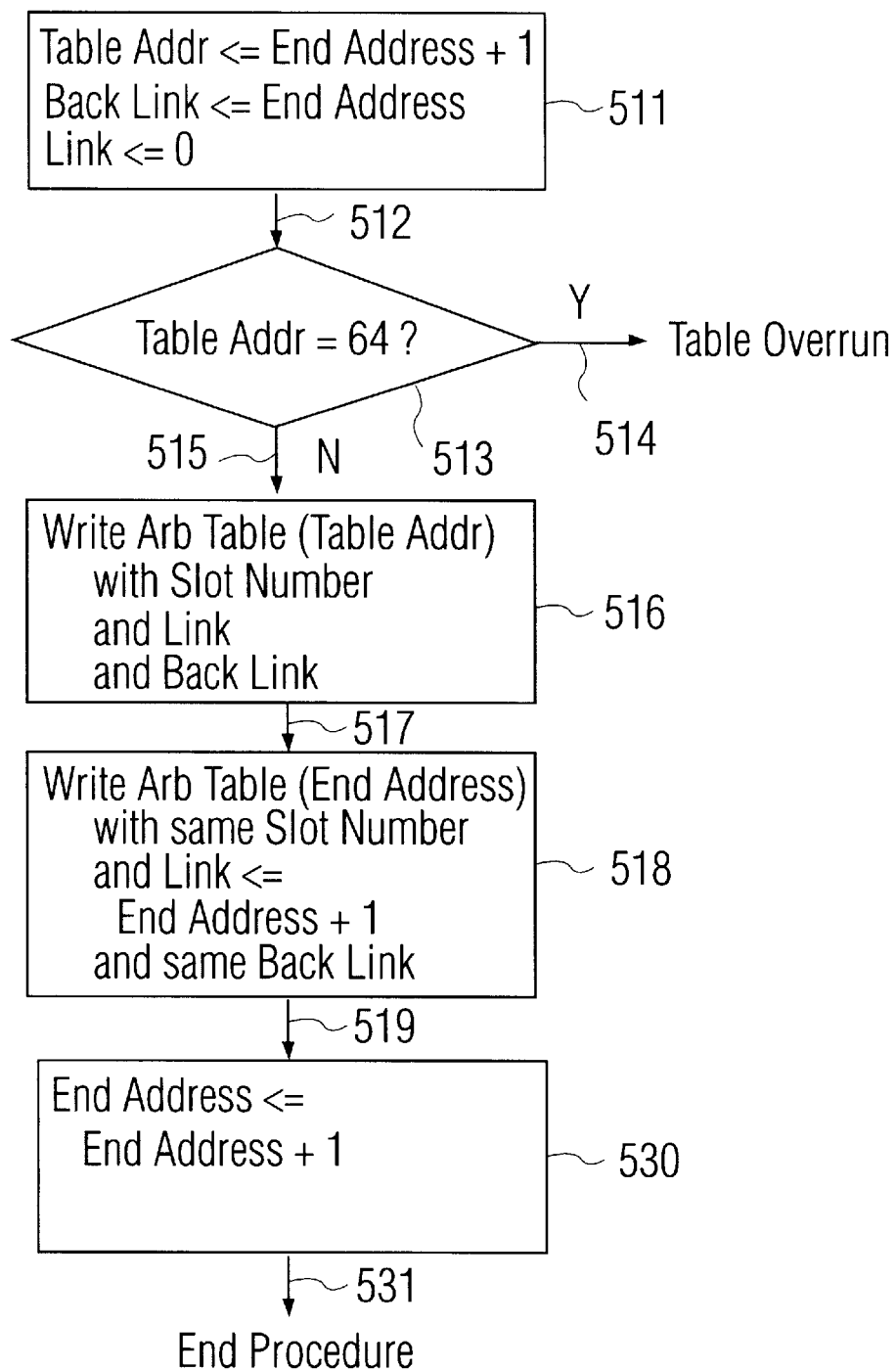
FIG. 10 is a flow diagram showing a procedure to add a low priority slot or add bandwidth for a slot.

Referring to FIG. 10, the procedure to add a low priority slot or increase bandwidth for a slot is initiated at step 511 wherein the Table Addr is set to the End Address plus one (effectively adding a new address), the back link is set to the end address and the link is set to zero (to return to the beginning of the table). The procedure continues at 512 to step 513 wherein it is checked to see if the table address is equal to 64. If it is equal to 64, a table overrun procedure is initiated at 514. If the new table address is not 64, the procedure continues at 515 to step 516. The Arb Table is written at (table Addr) with the Slot Number and Link and Back Link. The procedure continues at 517 to step 518 wherein the Arb Table is written at (End Address) with same Slot Number and Link set to the End Address plus one and same Back Link. The procedure continues at 519 to step 530 where the end address is set to the end address plus one. The procedure then ends at 531.

PROCEDURE FOR DELETING A SLOT

Figure 11A:
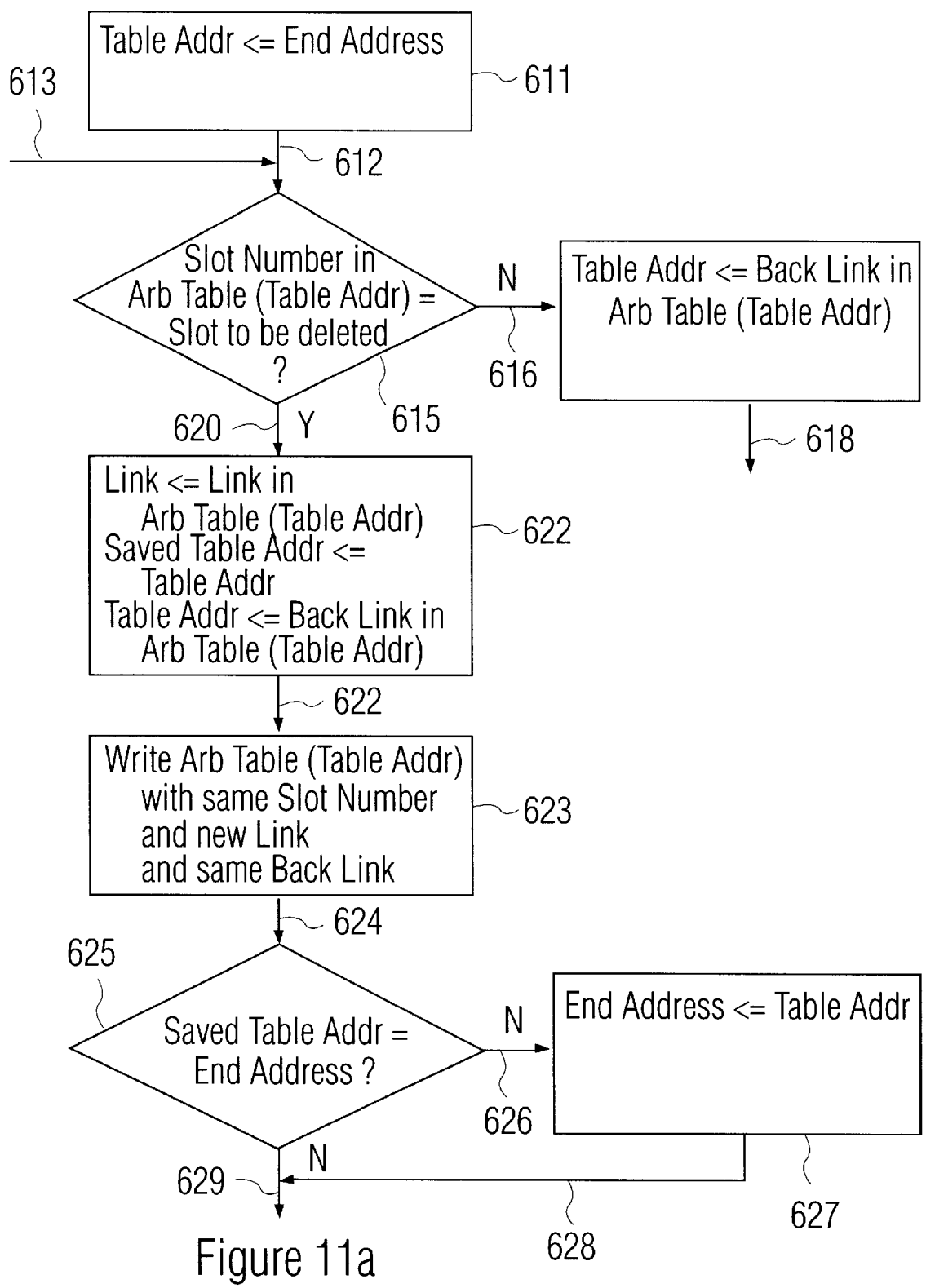
FIGS. 11a and 11b are portions of a flow diagram for a procedure to delete a slot from the table (to delete all entries relating to a slot)
Figure 11B:
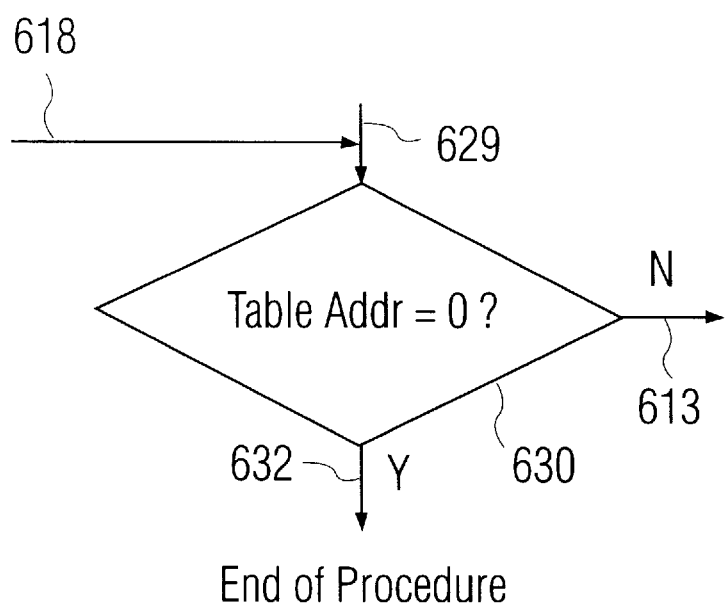

Referring to FIGS. 11a and 11b in particular, a procedure for deleting a slot is shown in a flow diagram form. The procedure starts at step 611 wherein the Table Addr is set to the End Address. The procedure continues at 612 to step 615 wherein it is checked that the slot number in the Arb Table (table address) is equal to the slot to be deleted. If the Slot Number in the Arb Table at the table address (initially the end address) is not the slot to be deleted, the procedure goes to the step 617 wherein the table address is set to the back link in the Arb Table (table address). The procedure continues at 618 and 629 to step 630 where the Table Addr is checked to see if it equals zero. If it is not equal to zero the procedure continues at 613 and 612 back to step 615. If at step 615 the slot number in the Arb Table (table address) is equal to the slot to be deleted the procedure continues at 620 to step 621 and the link is set to the link in the Arb Table (table address) the saved Table Addr is set to the Table Addr and the Table Addr is set to the back link in the Arb Table (table address). The procedure continues at 622 to step 623 wherein the Arb Table is written (the table address) with the same slot number, and a new link and the same back link. The procedure continues at 624 step 625 wherein it is checked if the saved Table Addr is equal to the End Address. If a saved Table Addr is equal to the End Address the procedure continues at 626 to step 627 wherein the End Address is set to the Table Addr. If at step 625 the saved Table Addr is not equal to the End Address the procedure continues at 629 to step 630. At step 630 it is checked to see if the Table Addr is equal to zero. If the Table Addr is equal to zero, the procedure is completed at 632 (end of procedure).

PROCEDURE TO DECREASE BANDWIDTH FOR A SLOT

Figure 12:
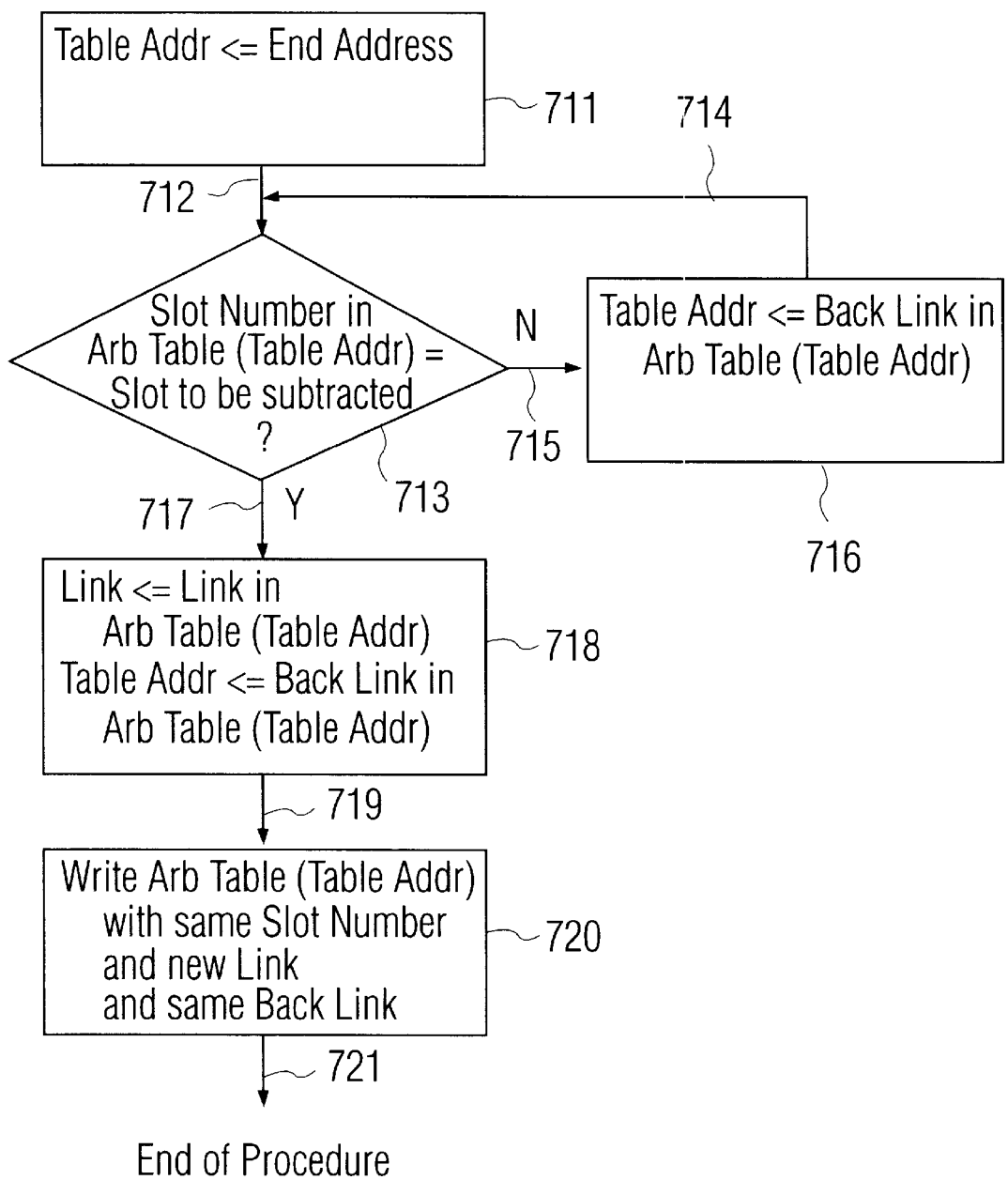
FIG. 12 is a flow diagram showing a procedure for decreasing bandwidth for a slot.

The procedure for decreasing the bandwidth for a slot is described with reference to the flow diagram of FIG. 12.

The procedure starts at step 711 wherein the Table Addr is set to the End Address. The procedure continues at 712 to step 713 wherein the slot number in the Arb Table (the table address) is checked to see if it is the slot which is to be subtracted (to have its bandwidth decreased). If it is not, the procedure continues at 715 to step 716 wherein the Table Addr is set for the Back Link in the Arb Table (table address), namely the preceding slot number is considered. The procedure continues at 714 and 712 to 713 wherein the Slot Number is again checked to see if it is the slot to be subtracted. When the Slot Number in the Arb Table is the slot to be subtracted, the procedure continues at 717 to step 718 wherein the Link is set to the Link in the Arb Table (table address) and the Table Addr is set to the Back Link in the Arb Table (table address). The procedure continues at 719 to step 720 wherein the Arbi Table (table address) is written to with the same Slot Number and new Link and same Back Link. This results in a decrease in the bandwidth allocated to the slot (a reduction of entries with the slot number for the arbitration table).

While specific embodiments of the invention have been shown and described in detail to illustrate the application of the principles of the invention, it will be understood that the invention may be embodied otherwise without departing from such principles.

What is claimed is:

1. A bus arbitration system for determining a sequence of bus access between a number of modules connected to the bus, comprising:

memory means for storing data including a table comprising entries, each of said entries representing a module slot identification number and having an entry link portion linking one entry to another entry;

write means for writing data to said table; and arbiter logic means for cycling through and reading said table from one entry to another entry based on said entry link portion and forming an output of a current slot identification number which is to have access to said bus, whereby the number of entries having a particular module slot identification number relative to the total number of entries determines a proportion of access to the bus of the module having said particular module slot identification number thereby allowing updating to said table to change access to said bus more readily.

2. The bus arbitration system according to claim 1, wherein said write means includes means for updating said table including adding additional entries to said table for changing a proportion of access to the bus.

3. The bus arbitration system according to claim 1, wherein said write means includes means for updating said table including deleting entries from said table for changing a proportion of access to the bus.

4. The bus arbitration system according to claim 1, wherein software maintains a link back portion linking one entry to a previous entry in the table.

5. The bus arbitration system according to claim 1, wherein said memory means comprises data in the form of a second table comprising second table entries, each of said second table entries representing a module slot identification number and having a second table entry link portion linking one second table entry to another second table entry, said write means and writing data to said second table, said arbiter logic means switching from said table to said second table for cycling through and reading said second table from one second table entry to another second table entry based on said second table entry link portion and forming an output of a current slot identification number which is to have access to said bus allowing a creation of said table anew while using said second table.

6. The bus arbitration system according to claim 1, wherein said write means creates said table based on software for:

determining a table size to determine the number of entries in the table including determining a number of slots requiring a higher proportion of said bus and a number of slots requiring a lower proportion of said bus;

determining the number of entries for a slot based on the table size; and assigning slots to the entries, based on the number of entries determined.

7. A computer network backplane and arbitration system, comprising:

a DATA line;

a plurality of modules connected to said DATA line, each of said plurality of modules including transmitter means for transmitting and receiving a packet onto and from said DATA line;

an arbiter selecting modules for access to said data line including:

a memory storing data including a table comprising entries, each of said entries representing a module slot identification number and having an entry link portion linking one entry to another entry;

a write device writing data to said table; and arbiter logic cycling through and reading said table from one entry to another entry based on said entry link portion and forming an output of a current slot identification number which is to have access to said bus, whereby the number of entries having a particular module slot identification number relative to the total number of entries determines a proportion of access to the bus of the module having said particular module slot identification number.

8. The computer network backplane and arbitration system according to claim 7, wherein said write device includes means for updating said table including adding additional entries to said table for changing a proportion of access to the bus.

9. The computer network backplane and arbitration system according to claim 7, wherein said write device includes means for updating said table including deleting entries from said table for changing a proportion of access to the bus.

10. The computer network backplane and arbitration system according to claim 7, wherein software maintains a link back portion linking one entry to a previous entry in the table.

11. The computer network backplane and arbitration system according to claim 7, wherein said memory device comprises data in the form of a second table comprising second table entries, each of said second table entries representing a module slot identification number and having a second table entry link portion linking one second table entry to another second table entry, said write device writing data to said second table, said arbiter logic switching from said table to said second table for cycling through and reading said second table from one second table entry to another second table entry based on said second table entry link portion with and forming an output of a current slot identification number which is to have access to said bus allowing a creation of said table anew while using said second table.

12. The computer network backplane and arbitration system according to claim 7, wherein said writing device creates said table based on software for:

determining a table size to determine the number of entries in the table including determining a number of slots requiring a higher proportion of said bus and a number of slots requiring a lower proportion of said bus;

determining the number of entries for a slot based on the table size; and assigning slots to the entries, based on the number of entries determined.

13. A process for determining a sequence of bus access between a number of modules connected to the bus, comprising the steps of:

storing data in a memory, the data including a table comprising entries, each of said entries representing a module slot identification number and having an entry link portion linking one entry to another entry;

writing data to said table;

cycling through and reading said table from one entry to another entry based on said entry link portion; and forming an output of a current slot identification number which is to have access to said bus, whereby the number of entries having a particular module slot identification number relative to the total number of entries determines a proportion of access to the bus of the module having said particular module slot identification number.

14. The process according to claim 13, further comprising:

updating said table including adding additional entries to said table for changing a proportion of access to the bus.

15. The process according to claim 13, further comprising:

updating said table including deleting entries from said table for changing a proportion of access to the bus.

16. The process according to claim 13, further comprising:

providing each entry with a link back portion linking one entry to a previous entry in the table.

17. The process according to claim 13, further comprising:

providing a second table comprising second table entries, each of said second table entries representing a module slot identification number and having a second table entry link portion linking one second table entry to another second table entry;

reading data from said second table and writing data to said second table;

switching from said table to said second table for cycling through said second table from one second table entry to another second table entry based on said second table entry link portion;

forming an output of a current slot identification number which is to have access to said bus; and creating said table anew while using said second table.

18. The process according to claim 13, further comprising:

creating said table including:

determining a table size to determine the number of entries in the table including determining a number of slots requiring a higher proportion of said bus and a number of slots requiring a lower proportion of said bus;

determining the number of entries for a slot based on the table size; and assigning slots to the entries, based on the number of entries determined.

* * * * *